(12) United States Patent
Yao et al.

(10) Patent No.: US 11,406,958 B2
(45) Date of Patent: Aug. 9, 2022

(54) LIGHT ALKANES TO LIQUID FUELS

(71) Applicant: PHILLIPS 66 COMPANY, Houston, TX (US)

(72) Inventors: Jianhua Yao, Bartlesville, OK (US); Neal D. McDaniel, Ochelata, OK (US); Bruce B. Randolph, Bartlesville, OK (US); Robert M. Walston, Skiatook, OK (US); Anthony O. Baldridge, Bartlesville, OK (US); James A. Suttil, Bartlesville, OK (US); Soumen Kundu, Pearland, TX (US); Hong Xie, Bartlesville, OK (US); Steven E. Lusk, Ponca City, OK (US)

(73) Assignee: Phillips 66 Company, Houston, TX (US)

( * ) Notice: Subject to any disclaimer, the term of this patent is extended or adjusted under 35 U.S.C. 154(b) by 169 days.

(21) Appl. No.: 17/095,173

(22) Filed: Nov. 11, 2020

(65) Prior Publication Data

US 2021/0138429 A1     May 13, 2021

Related U.S. Application Data

(60) Provisional application No. 62/934,337, filed on Nov. 12, 2019.

(51) Int. Cl.
*B01J 29/40*      (2006.01)
*B01J 19/24*      (2006.01)
(Continued)

(52) U.S. Cl.
CPC .......... *B01J 19/245* (2013.01); *B01D 5/0057* (2013.01); *B01D 53/002* (2013.01);
(Continued)

(58) Field of Classification Search
None
See application file for complete search history.

(56) References Cited

U.S. PATENT DOCUMENTS 5,110,446 A * 5/1992 Harandi ................. C10G 57/02
                                                     208/92
6,410,813 B1 * 6/2002 Dath ........................ B01J 29/40
                                                    585/653

(Continued)

OTHER PUBLICATIONS

N. Viswanadham, G. Muralidhar, T.S.R. Prasada Rao, "Cracking and Aromatization Properties of Some Metal Modified ZSM-5 Catalysts for Light Alkane Conversions," Journal of Molecular Catalysis A: Chemical 223 (2004), pp. 269-274.

*Primary Examiner* — Tam M Nguyen
(74) *Attorney, Agent, or Firm* — Phillips 66 Company

(57) ABSTRACT

The present disclosure relates generally processes and systems for converting a C2-C7 light alkanes feed to liquid transportation fuels or value-added chemicals. The feed is contacted with an aromatization catalyst at a temperature and pressure that selectively converts C4 and larger alkanes to an intermediate product comprising monocyclic aromatics and olefins. Following separation of the aromatics and C5+ hydrocarbons from the intermediate product, unconverted C2-C3 alkanes are thermally-cracked to produce olefins that are subsequently oligomerized to produce a liquid transportation fuel blend stock or value-added chemicals.

15 Claims, 1 Drawing Sheet

(51) Int. Cl.
*C10G 63/04* (2006.01)
*B01D 53/047* (2006.01)
*B01D 5/00* (2006.01)
*B01D 53/00* (2006.01)

(52) U.S. Cl.
CPC ............ *B01D 53/047* (2013.01); *B01J 29/40* (2013.01); *C10G 63/04* (2013.01); *B01D 2256/24* (2013.01); *B01D 2257/702* (2013.01); *B01J 2219/0004* (2013.01); *C10G 2300/1081* (2013.01); *C10G 2300/4006* (2013.01); *C10G 2300/4012* (2013.01); *C10G 2300/4018* (2013.01); *C10G 2400/02* (2013.01); *C10G 2400/04* (2013.01)

(56) References Cited

U.S. PATENT DOCUMENTS

| | | | |
|---|---|---|---|
| 2012/0238787 A1* | 9/2012 | Gruber | C12P 5/00 585/16 |
| 2020/0339489 A1* | 10/2020 | Baldridge | C07C 5/2708 |
| 2021/0032182 A1* | 2/2021 | Molinier | B01J 19/0046 |
| 2021/0139795 A1* | 5/2021 | Yao | C10G 11/05 |

* cited by examiner

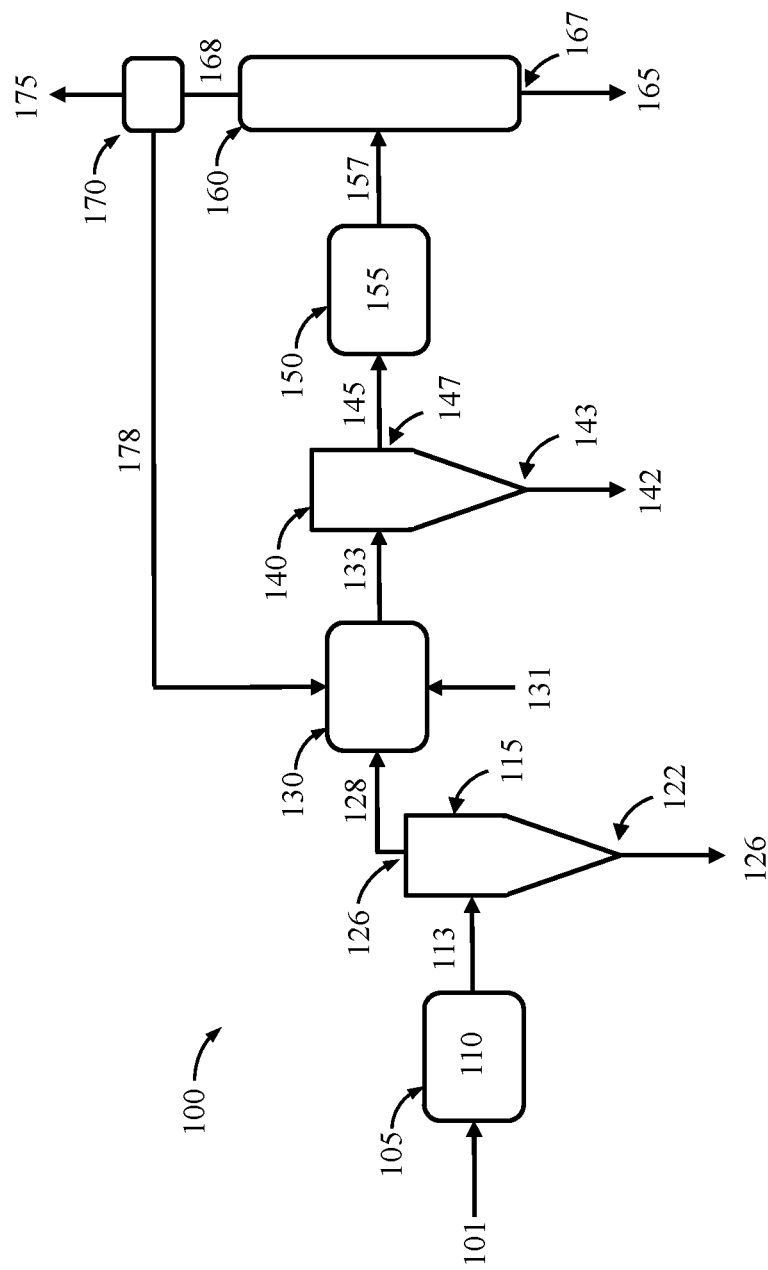

LIGHT ALKANES TO LIQUID FUELS

CROSS-REFERENCE TO RELATED APPLICATIONS

This application is a non-provisional application which claims the benefit of and priority to U.S. Provisional Application Ser. No. 62/934,337 filed Nov. 12, 2019 titled "Light Alkanes to Liquid Fuels," which is hereby incorporated by reference in its entirety.

STATEMENT REGARDING FEDERALLY SPONSORED RESEARCH OR DEVELOPMENT

None.

FIELD OF THE INVENTION

The present disclosure relates to processes and systems for converting light paraffins to liquid hydrocarbon transportation fuels.

BACKGROUND

Light paraffins produced alongside tight oil and natural gas are typically of lesser value than olefins or liquid fuels, and increased production of these light paraffins from U.S. shale formations has created a market surplus of natural gas liquids (NGL). After being extracted in the field, a largely de-methanized NGL stream predominantly comprising C2-C7 hydrocarbons (also called Y-grade), is typically transported by pipelines from the production site to a fractionation facility where the NGL stream is separated into discrete components, including ethane, propane, iso-butane, n-butane, and natural gasoline (C5+).

Several commercial upgrading options exist for various components of natural gas liquids but require the added expense of a preliminary separation step. Other techniques utilize an initial steam cracking step to upgrade these light paraffins, either individually or as a mixture. Still other processes instead utilize fluidized bed catalytic cracking for propane and heavier paraffins, but still require removal of ethane prior to upgrading of larger NGL components.

The process flexibility needed to simultaneously upgrade the full range of NGL hydrocarbons comprising from two to seven carbon atoms is a daunting technical challenge, as these various components are upgraded most optimally at significantly different conditions of temperature and pressure. Accordingly, there is a need for an improved process that simultaneously upgrades of both light and heavy components of an NGL mixture that predominantly comprises C2-C7 alkane hydrocarbon (e.g., Y-grade) to liquid transportation fuels.

BRIEF SUMMARY OF THE DISCLOSURE

The present inventive disclosure relates to processes and systems for converting a mixture of light paraffins into products that can be used as a liquid transportation fuel, or blend component thereof. In general, the process first contacts a light alkanes feed that may the full range of hydrocarbons typically found in natural gas liquids (NGL) with an aromatization catalyst under mild conditions of temperature and pressure that leaves most C2-C3 hydrocarbons unreacted. These unreacted light (C2-C3) alkanes are then thermally-cracked to olefins and oligomerized in an oligomerization reactor maintains or increases overall yield while improving yield of hydrocarbons in the diesel boiling-point range.

Certain embodiments of the invention comprise a system for converting a light alkanes feed stream to liquid transportation fuels or monocyclic aromatics, comprising: a.) an aromatization reactor containing at least one aromatization catalyst, the aromatization reactor operable to receive a light alkanes feed stream comprising at least 70 wt. % alkanes, where at least 90 mol % of the alkanes contain from two to four carbon atoms, the aromatization reactor further operable to facilitate contact between the light alkanes feed stream and the aromatization catalyst at a temperature in the range from 350° C. to 575° C. to produce a first effluent comprising C5+ hydrocarbons comprising light olefins, monocyclic aromatics, hydrogen and unconverted light alkanes that contain three or less carbon atoms; b.) a first separator operable to receive and partially condense the first effluent to produce a first condensed liquid hydrocarbons comprising C5+ hydrocarbons, and an uncondensed light hydrocarbons comprising alkanes containing from to four carbon atoms; c.) a thermal cracking reactor operable to receive the uncondensed light hydrocarbons from the first separator and thermally-activate the uncondensed light hydrocarbons at a temperature that is sufficient to convert at least a portion of the uncondensed light hydrocarbons to a second effluent comprising olefins and C5+ hydrocarbons; d.) a second separator operable to receive and partially condense the second effluent to produce a second condensed liquid hydrocarbons comprising hydrocarbons that contain five or more carbon atoms and a light olefins stream comprising alkanes containing from two to four carbon atoms; e.) an oligomerization reactor that contains at least one oligomerization catalyst, the oligomerization reactor operable to receive the light olefins stream from the second separator and facilitate contact between the light olefins stream and a the oligomerization catalyst at a temperature and pressure that facilitates the catalytic conversion of the light olefin stream by the oligomerization catalyst to produce a third effluent comprising monocyclic aromatics, alkanes containing at least five carbon atoms, light alkanes containing from one to four carbon atoms and hydrogen; f.) a third separator operable to receive and partially condense the third effluent to produce a fuel gas stream comprising light alkanes containing from one to four carbon atoms and hydrogen and a third condensed liquid hydrocarbons comprising alkanes, olefins and aromatics containing at least five carbon atoms that possess the characteristics of at least one of: a liquid transportation fuel component and a value-added chemical intermediate.

Certain embodiments further comprise a fourth separator operable to receive and separate the fuel gas stream and produce a hydrogen stream and a light olefins and light alkanes stream comprising olefins and alkanes containing from two to four carbon atoms.

In certain embodiments, the fourth separator is operable to separate the fuel gas stream by pressure swing adsorption. In certain embodiments, the aromatization reactor is further operable to receive a light alkanes feed stream that comprises at least 97 wt. % alkanes containing from two to six carbon atoms.

Certain embodiments further comprise a conduit operable to convey the light olefins and light alkanes stream to the thermal cracking reactor.

In certain embodiments, the aromatization reactor is operable to maintain a temperature in the range from 350° C. to 575° C. In certain embodiments, the temperature that is maintained in the aromatization reactor is in the range from 400° C. to 525° C. In certain embodiments, the aromatization reactor is operable to maintain a partial pressure of alkanes containing from four to seven carbon atoms that is in the range from 10 psig to 100 psig.

In certain embodiments, the aromatization reactor is operable to facilitate conversion of at least a portion of the light alkanes feed stream to produce a first effluent comprising at least 15 wt. % of monocyclic aromatics while leaving at least 95 mol % of alkanes containing two or three carbon atoms unreacted. In certain embodiments, the catalyst in the aromatization reactor comprises ZSM-5 zeolite.

In certain embodiments, the oligomerization reactor is operable to maintain a temperature in the range from 225° C. to 400° C. In certain embodiments, the oligomerization reactor is operable to maintain a pressure in the range from 0 psig to 300 psig. In certain embodiments, the oligomerization reactor is operable to facilitate oligomerization at least 85 mol % of C2-C4 olefins present in the light olefin stream. In certain embodiments, the catalyst in the oligomerization reactor comprises ZSM-5 zeolite.

In certain embodiments, the light alkanes feed stream comprises a Y-grade fraction of natural gas liquids.

BRIEF DESCRIPTION OF THE DRAWINGS

A more complete understanding of the present invention and benefits thereof may be acquired by referring to the following description taken in conjunction with the accompanying drawings in which:

The FIGURE is a flow diagram representing one embodiment of the inventive processes and systems.

The invention is susceptible to various modifications and alternative forms, specific embodiments thereof are shown by way of example in the drawings. The drawing may not be to scale. It should be understood that the drawing is not intended to limit the scope of the invention to the particular embodiment illustrated.

DETAILED DESCRIPTION

The present inventive disclosure relates to processes and systems for converting a light alkanes feed stream to a hydrocarbon product (or products) that possesses the characteristics of a liquid transportation fuel (or a blend stock thereof), or that possesses the characteristics of an intermediate product that can be further upgraded via chemical processes to produce various value-added chemicals. The light alkanes feed stream predominantly comprises alkanes containing from two to seven carbons (C2-C7), preferably alkanes comprising from C2-C5 carbon atoms (C2-C5). In certain embodiments, the light alkanes feed stream comprises at least 50 wt. % alkanes and at least 90 mol % of these alkanes contain from two to four carbon atoms (C2-C4). In certain embodiments, the light alkanes feed stream comprises at least 70 wt. % alkanes and at least 90 mol % of these alkanes contain from two to four carbon atoms (C2-C4). In certain embodiments, the light alkanes feed stream comprises at least 85 wt. % alkanes and at least 90 mol % of these alkanes contain from two to four carbon atoms (C2-C4).

In certain embodiments, the light alkanes feed stream comprises at least 50 wt. % alkanes and at least 97 mol % of these alkanes contain from two to six carbon atoms (C2-C6). In certain embodiments, the light alkanes feed stream comprises at least 70 wt. % alkanes and at least 97 mol % of the alkanes contain from two to six carbon atoms (C2-C6). In certain embodiments, the light alkanes feed stream comprises at least 85 wt. % alkanes and at least 97 mol % of the alkanes contain from two to six carbon atoms (C2-C6).

One source of the light alkanes feed stream is a naturally-occurring mixture of hydrocarbons produced from petroleum deposits that is commonly referred to as "Y-grade". The Y-grade sub-fraction of natural gas liquids predominantly comprises ethane, propane, butanes and pentanes, with residual quantities of hexane and heptane. Y-grade typically has been de-methanized to remove methane that may be co-produced from petroleum deposits along with the C2-C7 hydrocarbons.

In certain embodiments, the light alkanes feed stream is first contacted with an aromatization catalyst at a temperature and a pressure that selectively facilitates the catalytic activation and aromatization of alkanes that contain from four to seven carbon atoms (C4-C7). This produces a first effluent comprising a mixture of olefins and monocyclic aromatics while allowing most feed alkanes containing two or three carbon atoms (C2-C3) to remain unreacted. Following condensation and separation of C4 and larger products from the first effluent as a first condensed liquid hydrocarbons, the remaining uncondensed light alkanes are thermally-cracked at a temperature that maximizes conversion of C2-C3 alkanes to olefins, thereby producing a second effluent predominantly comprising light olefins containing from two to four carbons and some larger hydrocarbons (C5+) that are condensed in the second separator. The second effluent is contacted with an oligomerization catalyst at a pressure and temperature that facilitates the catalytic oligomerization of olefins to form higher molecular weight products that may be utilized as a transportation fuel or component thereof.

This approach is preferable to conventional processes that attempt to upgrade an entire C2-C7 feed in a single step by thermal cracking, catalytic dehydrogenation or catalytic cracking. Thermal cracking of paraffins for olefin production is energy-intensive, and thermal cracking of ethane requires temperatures exceeding 800° C. Catalytic dehydrogenation potentially provides higher selectivity to desired products, but suffers from problems with catalyst deactivation, is especially susceptible to catalyst poisons (e.g., sulfur, nitrogen, carbon monoxide) and is subject to significantly more external competition. Catalytic cracking of light paraffins also requires high temperatures that typically exceed 650° C.

In contrast, the selective catalytic activation and aromatization of C4-C7 alkanes that are present within a C2-C7 light alkanes feed stream significantly relaxes limitations on conversion related to the dynamic equilibrium of the reaction when compared to catalytic dehydrogenation of the same feed stream. This decreases operational expense of the process by avoiding the need to extensively recycle C4-C7 hydrocarbons that remain unconverted after the first aromatization step.

In brief, the inventive processes and systems disclosed herein describe a multi-step hydrocarbon conversion that improves the overall yield of products (compared to conventional processes) that can be utilized as a component of a liquid hydrocarbon transportation fuel. The light alkanes feed stream contacts a first catalyst in an aromatization reactor to produce a first effluent, where the aromatization reactor is maintained at a temperature and pressure that is suitable to facilitate the selective catalytic activation and aromatization (or olefinization) of at least a portion of the C4-C7 alkanes in the light alkanes feed stream to monocyclic aromatics and olefins while leaving alkanes that contain from two to three carbon atoms largely unreacted, thereby producing a first effluent that comprises monocyclic aromatics (predominantly, benzene, toluene and xylene), olefins and unconverted light alkanes that contain three or less carbon atoms.

The first effluent is then partially condensed in a first separator, thereby producing a first pyrolysis gasoline fraction comprising olefins and aromatics containing at least four carbon atoms. The first pyrolysis gasoline fraction may be further upgraded to products suitable for use as a liquid transportation fuel blend stock according to conventional methods known in the art, or alternatively utilized as a feed stock for any of a number of different chemical production processes.

The remaining uncondensed portion in the first separator is an uncondensed light alkane fraction that predominantly comprises unconverted ethane and propane. This uncondensed light alkane fraction is next conveyed to a thermal cracking zone and thermally-cracked then quenched to produce a second effluent that comprises predominantly C2-C4 olefins, as well as some hydrogen, methane, C2-C4 alkanes, acetylene and a small amount of C5+. Thermal cracking of light olefins is conventional in nature, and thus will not be discussed further here.

Following the thermal cracking step and subsequent quenching, the second effluent is conveyed to a second separator that is operable to selectively condense the second effluent to produce a second pyrolysis gasoline comprising liquid hydrocarbons containing at least four carbon atoms. The second pyrolysis gasoline may be combined with the first pyrolysis gasoline and further upgraded (as described above). The remaining uncondensed portion of the second effluent comprises an uncondensed light olefins fraction that in turn predominantly comprises C2-C3 olefins. These light olefins are conveyed to a third reaction zone containing at least one zeolite catalyst that is operable to convert the light olefins to larger hydrocarbons that may be combined with the first and/or second pyrolysis gasoline fractions and further upgraded (as described above).

The processes and systems described herein provide numerous advantages, some of which are delineated below. Other undescribed advantages may well exist, and thus, the listing of advantages is not intended to be exhaustive or to limit the scope of the invention to less than the scope of the appended claims.

Many conventional processes for upgrading NGLs require an expensive initial separation of the NGL hydrocarbons into fractions based upon carbon number, or carbon number range (e.g., C2, C3, C4-5, C6-C7, etc.). Each fraction is then separately upgraded in order to achieve efficient upgrading. However, the upgrading processes disclosed herein improves efficiency relative to conventional processes and systems by efficiently upgrading an entire NGL stream (or C2-C7 light alkanes stream). The present inventive processes thus eliminates the need to first separate an NGL feed into multiple fractions that are then separately upgraded. In certain embodiments, the feed stream comprises what is commonly referred to in the art as a "Y-grade" fraction of natural gas liquids.

There are numerous additional advantages afforded by the inventive processes and systems disclosed herein. Among them, the first conversion is performed at conditions of temperature and pressure that are sufficient to convert mainly C4 and larger alkanes present in the feed stream to form products comprising aromatics, pyrolysis gasoline and some small alkanes (as a side-product). The conditions utilized are insufficient to effectively facilitate upgrading of smaller C2-C3 hydrocarbons, leaving them largely unreacted. The inventors hypothesize (while not allowing the inventive disclosure be limited by theory) that these less-reactive C2-C3 alkanes act as an inert diluent in the aromatization reactor, thereby decreasing the rate of catalyst coking and extending useful lifespan of the aromatization catalyst.

A further advantage of the first conversion being conducted in the presence of C2-C3 alkanes is that the selective catalytic conversion of C4 and larger alkanes (present in the feed stream) to form products comprising aromatics and pyrolysis gasoline can be conducted at lower temperatures when in the presence of less reactive C2-C3 hydrocarbons. The present application demonstrates that the temperature required to achieve 50% catalytic activation for light alkanes (the first step in a hydrocarbon aromatization reaction) is significantly decreased when the catalytic activation is performed in the presence of smaller, less reactive alkanes. This further increases the efficiency of the inventive process.

The selective catalytic conversion of C4+ alkanes that occurs in the aromatization reactor also advantageously facilitates the separation of unreacted C2-C3 hydrocarbons from aromatics and other C4+ hydrocarbons that are produced in the aromatization reactor and that are present in the first effluent. This separation typically occurs in the first separator by simple selective condensation of the aromatics and residual C4+ hydrocarbons from the first effluent. The remaining uncondensed hydrocarbons comprise a light alkanes stream that predominantly comprises C2-C3 alkanes. This light alkanes stream is then conveyed to a thermal cracking reactor where it is thermally-cracked and converted to a second effluent comprising light olefins. The inventive processes and systems thus increase efficiency and decrease operating costs by avoiding any need to separate the C2-C7 hydrocarbon feed stream into separate fractions according to carbon number (e.g., C2-C3 alkanes fraction and C4+ alkanes fraction) prior to upgrading the separated components. Instead, separation is integrated with the selective conversion of C4+ alkanes from the C2-C7 hydrocarbon feed stream that takes place in the aromatization reactor.

Another potential advantage associated with the present inventive processes and systems is that larger C4-C7 alkanes are selectively converted at a lower temperature and pressure relative to conventional aromatization processes. This lower temperature allows C2-C3 alkanes in the feed stream to pass through the aromatization reactor largely unreacted, while simultaneously minimizing the catalytic cracking of C4-C7 alkanes to undesirable butadiene and acetylene contaminants. Such contaminants can deactivate downstream upgrading catalysts and must be removed from conventional process that crack larger alkanes.

Still another potential advantage of the present inventive processes and systems is that the smaller hydrocarbons present in the C2-C7 hydrocarbon feed stream (in particular, the less chemically-reactive C2-C3 alkanes) may function as an inert (or optionally, a chemically less-reactive) diluent of the conversion reactions that occur in the aromatization reactor. Such diluents typically reduce the rate of coke formation on the aromatization catalyst in the aromatization reactor, which decreases the rate of catalyst deactivation and extends the time between required catalyst regeneration cycles.

A more detailed description of the inventive processes and systems is facilitated by periodic reference to a first exemplary embodiment illustrated in FIG. 1. A light hydrocarbons feed stream 101 is catalytically converted in a system 100. Light hydrocarbons feed stream 101 predominantly comprises alkanes that each contain from two to seven carbon atoms (alternatively, alkanes containing from two to five carbon atoms) and is received by an aromatization reactor 105 that contains an aromatization catalyst 110. In certain embodiments, the light alkanes feed stream and further comprising at least 90 wt. % alkanes containing from two to six carbon atoms and a residual quantity of alkanes containing seven carbon atoms. In certain embodiments, the light alkanes feed stream comprises at least 97 wt. % alkanes containing from two to six carbon atoms and a residual quantity of alkanes containing seven carbon atoms.

Selective aromatization of C4-C7 paraffins in the aromatization reactor is generally believed to involve catalytic activation of the alkanes rapidly followed by dehydrogenation to yield light olefins. The olefins are then oligomerized followed by rapid cyclization to yield naphthenes, which undergo an additional dehydrogenation step to yield a monocyclic aromatic product. Speaking generally, the aromatization catalyst may comprise alumina, silica, or one or more of any of variety of different zeolite catalysts, including, but not limited to, HZSM-5, HZSM-6, HZSM-8, HZSM-11, MCM-22, MCM-41, mordenite, MFI, USY and FSM-16. The aromatization catalyst may further be impregnated with one or more metals, including, but not limited to Pt, Ni, Mo, Mn, Cu, W, Zn, Re, Fe, V, Ag and Ga. The degree of metal loading on the zeolite catalyst may also affect the efficiency of aromatization, and generally ranges from 2 wt. % to 10 wt. %. In certain embodiments, more than one metal may be impregnated on the aromatization catalyst, where one metal increases the dehydrogenation activity of the catalyst to increase aromatic yield. Further, the Si/Al ratio of the catalyst support must be kept within certain parameters to control the total acidity of the catalyst and also the number of Lewis acidic sites. Typically, Si/Al ratios of 40-200 of the zeolite framework have been noted to produce optimal aromatic yields. When ZSM-5 is utilized as aromatization catalyst, a Si/Al ratio for the catalyst support that ranges from 45 to 55 is preferred.

In general, the aromatization reactor is maintained at a temperature and pressure that predominantly converts alkanes containing four or more carbon atoms to at least one of olefins and aromatics, while leaving nearly all alkanes containing two or three carbon atoms unreacted. Example 1 (see below) discusses in greater detail the considerations that are required when selecting a temperature to be maintained in the aromatization reactor that will achieve this result. Speaking generally, the feed weight hourly space velocity in the aromatization reactor can range anywhere from 0.5 to 5 hr-1 but is most preferably between 1.0 and 1.5 hr$^{-1}$.

In certain embodiments, the temperature and the pressure that are maintained in the aromatization reactor are suitable to produce first effluent comprising at least 15 wt. % of monocyclic aromatics while leaving unreacted at least 75 mol % of C2-C3 alkanes present in the light alkanes feed stream. In certain embodiments, the temperature and the pressure that are maintained in the aromatization reactor are suitable to produce first effluent comprising at least 15 wt. % of monocyclic aromatics while leaving unreacted at least 85 mol % of C2-C3 alkanes that were present in the light alkanes feed stream. In certain embodiments, the temperature and the pressure that are maintained in the aromatization reactor are suitable to produce first effluent comprising at least 15 wt. % of monocyclic aromatics while leaving unreacted at least 95 mol % of C2-C3 alkanes that were present in the light alkanes feed stream.

In certain embodiments, the temperature maintained in the aromatization reactor is in the range from 350° C. to 575° C.; optionally, in the range from 350° C. to 500° C.; optionally, in the range from 400° C. to 500° C. In certain embodiments, the partial pressure of C4 to C7 alkane maintained in the aromatization reactor is in the range from 10 psig to 100 psig; optionally in the range from 5 psig to 75 psig.

Again, referring to FIG. 1, immediately following activation of C4+ alkanes in the aromatization reactor 105, activated alkane intermediates (not depicted) are converted by the aromatization catalyst 110 to produce a first effluent 113 comprising monocyclic aromatics, some olefins and unreacted light alkanes, which leaves the aromatization reactor 105 and is conveyed to a first separator 115.

First separator 115 is operable to receive the first effluent 113 and selectively condense aromatic hydrocarbons and other hydrocarbons containing at least 4 carbon atoms to produce a first condensed liquid hydrocarbons 126 that predominantly comprises benzene, toluene and xylene, The first condensed liquid hydrocarbons 126 leaves the first separator 115 via a first outlet 122, while an uncondensed light hydrocarbons 128 largely comprising alkanes containing from 2-3 carbon atoms leaves the first separator 115 via a second outlet 126. The first condensed liquid hydrocarbons 126 may be used as a component of a liquid transportation fuel, sold as a value-added industrial chemical, or further catalytically upgraded in one of many conventional process that are outside the scope of the present disclosure.

After leaving the first separator 115, the uncondensed light hydrocarbons 128 is next conveyed to a thermal cracking reactor 130 that is operable receive the uncondensed light hydrocarbons 128 and further operable to maintain a temperature that is sufficient to thermally activate and convert at least a portion of alkanes present in the uncondensed light hydrocarbons 128, thereby producing a second effluent 133 that predominantly comprises olefins and dienes containing from two to seven carbon atoms, along with some hydrogen, methane, CO, $CO_2$, pyrolysis gasoline and unreacted alkanes containing from one to three carbon atoms. The thermal cracking reactor 130 is further operable to receive a steam feed 131 that facilitates thermal cracking of the uncondensed light hydrocarbons 128. Thermal cracking, also commonly referred to as steam cracking, is a process for thermally-dehydrogenating alkanes at temperatures exceeding 800° C. Thermal cracking of alkanes is conventional in nature, and well characterized. Thus, it will not be described in further detail here.

Further referring to FIG. 1, the second effluent 133 leaves the thermal cracking reactor 130 and is conveyed into second separator 140 that is operable to receive and rapidly cool the second effluent 133 and prevent additional cracking reactions. The second separator 140 is further operable to condense at least a portion of the second effluent 133 to produce a second condensed liquid hydrocarbons 142 that comprises hydrocarbons containing five or more carbon atoms. The second condensed liquid hydrocarbons 142 exits the second separator 140 via a first outlet 143. The second condensed liquid hydrocarbons 142 , after removing water, may be combined with the first condensed liquid hydrocarbons 126 and used as a component of a liquid transportation fuel, may be sold as a value-added industrial chemical, or may be further catalytically upgraded in one of many conventional process that are outside the scope of the present disclosure. The remaining uncondensed portion of the second effluent 133 comprises a light olefins stream 145 comprising C2-C4 olefins and residual alkanes containing three or less carbon atoms. The light olefins stream 145 leaves the second separator 140 via a second outlet 147 and is conveyed into an oligomerization reactor 150.

The oligomerization reactor 150 contains at least one oligomerization catalyst 155. The oligomerization reactor 150 is operable to receive the light olefins stream 145 and facilitate contact between the light olefin stream 145 and the oligomerization catalyst 155 at conditions of temperature and pressure that facilitate the conversion of olefins that are present in raw light olefin stream 145 to produce a third effluent 157 comprising hydrocarbons that are characterized by an average higher molecular weight relative to the average molecular weight of molecules in the light olefin stream. The third effluent 157 further comprises hydrocarbons that contain at least five carbon atoms, (preferably, at least 7 carbon atoms).

In certain embodiments, the oligomerization reactor is maintained at a temperature and a pressure that facilitate the catalytic conversion of the light olefin stream by the oligomerization catalyst to produce a third effluent comprising at least 80 wt. % of hydrocarbons that contain at least five carbon atoms. In certain embodiments, the contacting of the light olefin stream with the oligomerization catalyst occurs at a temperature in the range from 100° C. and 450° C.; optionally, in the range from 225° C. to 400° C. In certain embodiments, the contacting of the light olefin stream with the oligomerization catalyst occurs at a pressure in the range from 0 psig to 300 psig; optionally, in the range from 50 psig to 200 psig; optionally, in the range from 0 psig to 150 psig.

Speaking generally, the oligomerization catalyst is optionally a zeolite, although any catalyst understood to be capable of oligomerizing olefins may be utilized. In certain embodiments, the oligomerization catalyst is ZSM-5. Speaking generally, the oligomerization catalyst may comprise any solid catalyst (or mixture of catalysts) characterized as possessing either Brnsted or Lewis acidic properties. In certain embodiments, the oligomerization catalyst is a zeolite or mixture of zeolites, or a reactive transition metal oxide. In certain embodiments, the oligomerization catalyst is ZSM-5, although many zeolites are well characterized as possessing oligomerization properties and may be suitable for use (either alone or in combination) with the processes and systems described herein. Other well-characterized oligomerization catalysts include, but are not limited to nickel oxides, aluminum alkyls, aluminum halides, perfluoroaryl boranes, oligomeric methyl aluminoxanes (including supported), perfluoroaryl boranes, fluoroarylanes, trityl borate, ammonium borate (and aluminate salts thereof), supported $[PhNMe_2H^+][B(C_6F_5)_4^-]$ and borate anions and super acidic solid Brnsted acids, among others.

The catalyst, temperature and pressure in the oligomerization reactor are operable to facilitate the conversion of C2-C3 olefins to larger hydrocarbons that may be used as a liquid transportation fuel component that are typically characterized by an increased average molecular weight (relative to the light olefins stream) and are optionally further characterized by a boiling point ranging from about 40° C. to about 245° C. at 1 atm, which is within in the boiling point range of a conventional gasoline fuel. In certain embodiments, the temperature, pressure and feed rate (weight hourly space velocity) maintained in the oligomerization reactor facilitate catalytic conversion by the oligomerization catalyst of at least 85 mol % of olefins containing from two to four carbon atoms that are present in the light olefin stream. In certain embodiments, the temperature, pressure and feed rate of the light olefin stream that are maintained in the oligomerization reactor facilitate the catalytic conversion of the light olefin stream by the oligomerization catalyst to produce a third effluent comprising at least 50 wt. % (optionally at least 60 wt. %; optionally at least 70 wt. %; optionally, at least 80 wt. %) of hydrocarbons that contain at least five carbon atoms. The feed weight hourly space velocity of the light olefin stream through the oligomerization reactor ranges anywhere from 0.5 to 5 $hr^{-1}$ but is most preferably between 1.0 and 1.5 $hr^{-1}$.

Referring again to the embodiment depicted schematically in FIG. 1, the third effluent 157 exits the oligomerization reactor 155 and is conveyed to a third separator 160 that is maintained at a temperature that allows the selective condensation of hydrocarbons comprising at least five carbon atoms. A third condensed liquid hydrocarbons 165 comprising hydrocarbons containing at least five carbon atoms exits the third separator 160 via a first outlet 167. A light hydrocarbon stream 168 comprising hydrocarbons characterized by four or less carbon atoms remains in vapor-phase and exits the third separator 160 via a second outlet, whereupon it is conveyed to a fourth separator 170 that separates the light hydrocarbon stream into a hydrogen and methane stream 175 and a light olefins and light alkanes stream 178 that is conveyed back to thermal cracking reactor 130 (or optionally, a point upstream from thermal cracking reactor 130). The light olefins and light alkanes stream 178 predominantly comprises ethylene and ethane, but also may include some residual olefins and alkanes comprising three or four carbon atoms that were not converted to larger hydrocarbons in the oligomerization reactor 150. Speaking generally, certain embodiments further comprise mixing two or more of the first condensed liquid hydrocarbons, the second condensed liquid hydrocarbons and the third condensed liquid hydrocarbons to produce a final liquid product hydrocarbons comprising hydrocarbon molecules that are characterized by a boiling point that is in the range of gasoline (40° C. to 193° C.) or diesel (193° C. to 360° C.).

Conditions of temperature and pressure are maintained in the oligomerization reactor 150 that facilitate the oligomerization of ethylene and propylene to form larger hydrocarbon products that preferably comprise at least five carbon atoms (optionally, at least 7 carbon atoms). Generally speaking, the contacting of the light olefin stream with the oligomerization catalyst occurs at a temperature in the range from 100° C. and 450° C.; optionally, in the range from 225° C. to 400° C.; optionally, in the range from 250° C. to 350° C. Generally speaking, the contacting of the light olefin stream with the oligomerization catalyst occurs at a pressure in the range from 0 psig to 300 psig. In certain embodiments, the operating conditions for the oligomerization reactor 150 generally include a pressure in a range from 0 psig to 300 psig; optionally at a pressure in the range from 50 psig to 200 psig. Generally, the feed rate to the oligomerization reactor is (measured as a gas hourly space velocity) in a range from 0.5 $hrs^{-1}$ to 5 $hrs^{-1}$. While higher overall productivity is desirable, typically at least 85% of the ethylene present in the light olefins stream is converted in the oligomerization reactor.

In certain embodiments, the unconverted light gases are subjected to separation in a fourth separator into a hydrogen, methane and a C2-C3 light alkanes stream that predominantly comprises ethane. Optionally, the hydrogen and methane are combusted to supply process heat, while the C2-C3 light alkanes stream may be conveyed to a point that is upstream from the cracking furnace and downstream from the first separator, where it is mixed with the uncondensed light hydrocarbons. Optionally, the fourth separator utilizes pressure swing adsorption to separate the unconverted light gases.

The following example is representative of one embodiment of the inventive processes and systems disclosed herein, and the scope of the invention is not intended to be limited to the embodiment specifically disclosed. Rather, the scope is intended to be as broad as is supported by the complete disclosure and the appending claims.

EXAMPLE 1

Table 1 (below) demonstrates the temperature (° C.) required to achieve 50% equilibrium conversion of a given hydrocarbon species by carbon number (e.g., C2, C3, C4, C5) or mixture of hydrocarbon species (i.e., C6+) when the converted hydrocarbon species (1' column, far left) is converted in the presence of a feed stream comprising C2+, C3+, C4+ and C5+ hydrocarbons (columns 2-5), or as a pure species (column 6) at 1 Atm pressure (0 psig). Note that C6+ is defined as a light hydrocarbon feed stream comprising alkanes containing six or more carbon atoms. The values shown are not an average or weighted-average, but rather the result of a mixed-equilibrium simulation. The calculations assume no dilution of the feed with steam or inert gases, no C-C bond cracking (or formation), and ambient total feed pressure for all simulations.

TABLE 1

Temperature required for conversion of an alkane of a given carbon number (first column) when mixed with a hydrocarbon feed comprising alkanes of various minimum carbon number (columns 2-5) or as a pure feed (sixth column). Temps are listed in ° C.

| Species: (50 wt. % Conv.) | Within a Feed Comprising: | | | | Pure Species |
|---|---|---|---|---|---|
| | $C_2+$ | $C_3+$ | $C_4+$ | $C_5+$ | Only (1 Atm) |
| C2 | 755 | | | | 720 |
| C3 | 584 | 628 | | | 607 |
| C4 | 496 | 532 | 568 | | 555 |
| C5 | 388 | 421 | 466 | 510 | 510 |
| C6+ | 252 | 282 | 340 | 403 | 460 |

Table 1 shows an advantage of the present inventive method and system by demonstrating that C4-C6 hydrocarbons are catalytically activated at a lower temperature when in the presence of other hydrocarbon compounds, particularly in the presence of less reactive C2-C3 hydrocarbons. For example, equilibrium conversion of 50 wt. % of a hydrocarbon species containing five carbon atoms (C5) is accomplished a 388° C. when in the presence of a feed comprising C2+ hydrocarbons. However, equilibrium conversion of 50 wt. % of C5 hydrocarbons in a feed containing only C5 hydrocarbons requires a temperature of 510° C. This demonstrates one of several advantages of the present inventive processes and systems, since the activation and aromatization of C4+ hydrocarbons in the C2-C7 hydrocarbon feed occurs in the presence of smaller hydrocarbons and therefore, can be accomplished at a lower temperature than if the C2-C7 hydrocarbon feed were first separated into C2-C3 and C4-C7 fractions that were then upgraded separately to transportation fuels.

EXAMPLE 2

To demonstrate the effectiveness of the oligomerization process disclosed herein, we performed zeolite-mediated oligomerization of light olefins according to one embodiment of the inventive two-stage upgrading process disclosed herein. A simulated cracked light olefin feed stream was utilized that comprised 23 mole % hydrogen, 23 mole % methane, 14 mole % ethane, 31 mole % ethylene, 6.5 mole % propylene, and 2.5 mole % 1-butene. This feed stream was designed to replicate a typical cracked olefin stream that is produced by the thermal cracking of the light olefins stream derived from the first separator. The feed stream was introduced to an oligomerization reactor containing a ZSM-5 zeolite catalyst. The reactor was maintained at a temperature of 320° C. and pressure of 50 psig. The effluent from the oligomerization reactor was then partially condensed to recover C5+ liquid hydrocarbons. Analysis of the liquid products condensed from the reactor effluent and the overall product distribution is reported in Table 2, below.

TABLE 2

Oligomerizing mixed light olefins to liquid hydrocarbon fuels on ZSM-5 catalyst using single stage process.

| | Oligomerization |
|---|---|
| Time on stream (hrs) | |
| Temp (° C.) | 320 |
| Pressure (psig) | 50 |
| LHSV (hr−1) | 1 |
| Product selectivity (wt %) | |
| C1-C3 | 6.8 |
| C4 | 18.7 |
| C5 - 380 F.(Gasoline) | 68.7 |
| 380 F.-680 F.(Diesel) | 5.8 |
| Liquid Selectivity (wt %) | |
| Gasoline + Diesel | 75.4 |
| Light Olefin Conversion (%) | 98.7 |

Definitions

In the present disclosure, the term "catalytic activation" is defined as a chemical reaction facilitated by a catalyst that forms an activated hydrocarbyl intermediate from a C—H bond. The hydrocarbyl intermediate can then be functionalized to produce either an olefin or a larger hydrocarbon product via a mechanism that may include at least one of dehydrogenation, olefination, arylation, alkylation, dimerization, oligomerization, isomerization and aromatization.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify additional ways to practice the invention that are not exactly as described herein. It is the intent of the inventors that such variations and equivalents of the invention are within the scope of the claims.

We claim:

1. A system for converting a light alkanes feed stream to liquid transportation fuels or monocyclic aromatics, comprising:
   a. An aromatization reactor containing at least one aromatization catalyst, the aromatization reactor operable to receive a light alkanes feed stream comprising at least 70 wt. % alkanes, wherein at least 90 mol % of the alkanes contain from two to four carbon atoms, the aromatization reactor further operable to facilitate contact between the light alkanes feed stream and the aromatization catalyst at a temperature in the range from 350° C. to 575° C. to produce a first effluent comprising C5+ hydrocarbons comprising light olefins, monocyclic aromatics, hydrogen and unconverted light alkanes that contain three or less carbon atoms;

b. a first separator operable to receive and partially condense the first effluent to produce a first condensed liquid hydrocarbons comprising C5+ hydrocarbons, and an uncondensed light hydrocarbons comprising alkanes containing from to four carbon atoms;

c. a thermal cracking reactor operable to receive the uncondensed light hydrocarbons from the first separator and thermally-activate the uncondensed light hydrocarbons at a temperature that is sufficient to convert at least a portion of the uncondensed light hydrocarbons to a second effluent comprising olefins and C5+ hydrocarbons;

d. a second separator operable to receive and partially condense the second effluent to produce a second condensed liquid hydrocarbons comprising hydrocarbons that contain five or more carbon atoms and a light olefins stream comprising alkanes containing from two to four carbon atoms;

e. an oligomerization reactor that contains at least one oligomerization catalyst, the oligomerization reactor operable to receive the light olefins stream from the second separator and facilitate contact between the light olefins stream and a the oligomerization catalyst at a temperature and pressure that facilitates the catalytic conversion of the light olefin stream by the oligomerization catalyst to produce a third effluent comprising monocyclic aromatics, alkanes containing at least five carbon atoms, light alkanes containing from one to four carbon atoms and hydrogen;

f. a third separator operable to receive and partially condense the third effluent to produce a fuel gas stream comprising light alkanes containing from one to four carbon atoms and hydrogen and a third condensed liquid hydrocarbons comprising alkanes, olefins and aromatics containing at least five carbon atoms that possess the characteristics of at least one of: a liquid transportation fuel component and a value-added chemical intermediate.

2. The system of claim 1, further comprising a fourth separator operable to receive and separate the fuel gas stream and produce a hydrogen stream and a light olefins and light alkanes stream comprising olefins and alkanes containing from two to four carbon atoms.

3. The system of claim 2, wherein the fourth separator is operable to separate the fuel gas stream by pressure swing adsorption.

4. The system of claim 2, wherein the aromatization reactor is further operable to receive a light alkanes feed stream that comprises at least 97 wt. % alkanes containing from two to six carbon atoms.

5. The system of claim 1, further comprising a conduit operable to convey the light olefins and light alkanes stream to the thermal cracking reactor.

6. The system of claim 1, wherein the aromatization reactor is operable to maintain a temperature in the range from 350° C. to 575° C.

7. The method of claim 1, wherein the temperature that is maintained in the aromatization reactor is in the range from 400° C. to 525° C.

8. The system of claim 1, wherein the aromatization reactor is operable to maintain a partial pressure of alkanes containing from four to seven carbon atoms that is in the range from 10 psig to 100 psig.

9. The system of claim 1, wherein the aromatization reactor is operable to facilitate conversion of at least a portion of the light alkanes feed stream to produce a first effluent comprising at least 15 wt. % of monocyclic aromatics while leaving at least 95 mol % of alkanes containing two or three carbon atoms unreacted.

10. The system of claim 1, wherein the catalyst in the aromatization reactor comprises ZSM-5 zeolite.

11. The system of claim 1, wherein the oligomerization reactor is operable to maintain a temperature in the range from 225° C. to 400° C.

12. The system of claim 1, wherein the oligomerization reactor is operable to maintain a pressure in the range from 0 psig to 300 psig.

13. The system of claim 1, wherein the oligomerization reactor is operable to facilitate oligomerization at least 85 mol % of C2-C4 olefins present in the light olefin stream.

14. The system of claim 1, wherein the catalyst in the oligomerization reactor comprises ZSM-5 zeolite.

15. The system of claim 1, wherein the light alkanes feed stream comprises a Y-grade fraction of natural gas liquids.

* * * * *